(12) United States Patent
Mastrolia

(10) Patent No.: US 11,572,180 B2
(45) Date of Patent: Feb. 7, 2023

(54) INTERIOR DROGUE PARACHUTE ASSEMBLY FOR EJECTION SEATS

(71) Applicant: AMI Industries, Inc., Colorado Springs, CO (US)

(72) Inventor: Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 84 days.

(21) Appl. No.: 17/167,392

(22) Filed: Feb. 4, 2021

(65) Prior Publication Data

US 2021/0323683 A1 Oct. 21, 2021

Related U.S. Application Data

(60) Provisional application No. 63/013,220, filed on Apr. 21, 2020.

(51) Int. Cl.
*B64D 17/80* (2006.01)
*B64D 25/10* (2006.01)
*B64D 17/72* (2006.01)

(52) U.S. Cl.
CPC ........... *B64D 25/10* (2013.01); *B64D 17/725* (2013.01)

(58) Field of Classification Search
CPC ...... B64D 25/10; B64D 17/125; B64D 17/64; B64D 17/54; B64D 17/52; B64D 17/00; B64D 25/02; B64D 17/72; B64D 17/68; B64C 2201/185; B60N 2/0276
See application file for complete search history.

(56) References Cited

U.S. PATENT DOCUMENTS

| | | | | | |
|---|---|---|---|---|---|
| 2,502,470 | A | * | 4/1950 | Martin | B64D 25/10 89/27.11 |
| 2,569,638 | A | * | 10/1951 | Martin | B64D 25/10 244/122 AE |
| 3,586,257 | A | * | 6/1971 | Zelinskas | B64D 17/52 242/129 |
| 3,622,109 | A | * | 11/1971 | Drew | B64D 17/52 244/147 |
| 3,726,499 | A | * | 4/1973 | Stencel | B64D 17/383 244/141 |

(Continued)

FOREIGN PATENT DOCUMENTS

| | | |
|---|---|---|
| CN | 204399480 | 6/2015 |
| CN | 207433811 | 6/2018 |

(Continued)

OTHER PUBLICATIONS

United Kingdom Intellectual Roperty Office, United Kingdom Search Report dated Oct. 19, 2021 in Application No. GB2105554.6.

*Primary Examiner* — Medhat Badawi
*Assistant Examiner* — Vicente Rodriguez
(74) *Attorney, Agent, or Firm* — Snell & Wilmer L.L.P.

(57) ABSTRACT

A drogue parachute assembly may comprise a canopy housing and a mortar. The mortar may include an inner mortar tube and an outer mortar tube configured to telescope relative to the inner mortar tube. The canopy housing may be coupled to the outer mortar tube. A guide plate may be configured to contact an interface surface of the canopy housing and pivot the mortar about a pivot joint.

18 Claims, 8 Drawing Sheets

(56) References Cited

U.S. PATENT DOCUMENTS

| | | | | |
|---|---|---|---|---|
| 4,004,764 | A | | 1/1977 | Burklund et al. |
| 4,480,806 | A | * | 11/1984 | Duncan .................. B64D 25/10 244/122 A |
| 4,637,577 | A | | 1/1987 | Miseyko et al. |
| 4,709,885 | A | * | 12/1987 | Martin ................... B64D 17/72 244/141 |
| 4,749,153 | A | * | 6/1988 | Herndon ................ B64D 25/10 244/122 A |
| 4,765,570 | A | * | 8/1988 | Herndon ................ B64D 25/10 D12/345 |
| 10,399,686 | B2 | * | 9/2019 | Homan .................. B64D 17/26 |

FOREIGN PATENT DOCUMENTS

| | | |
|---|---|---|
| CN | 209834026 | 12/2019 |
| GB | 1383662 | 2/1974 |
| RU | 2621133 | 5/2017 |
| WO | 2009112875 | 9/2009 |

* cited by examiner

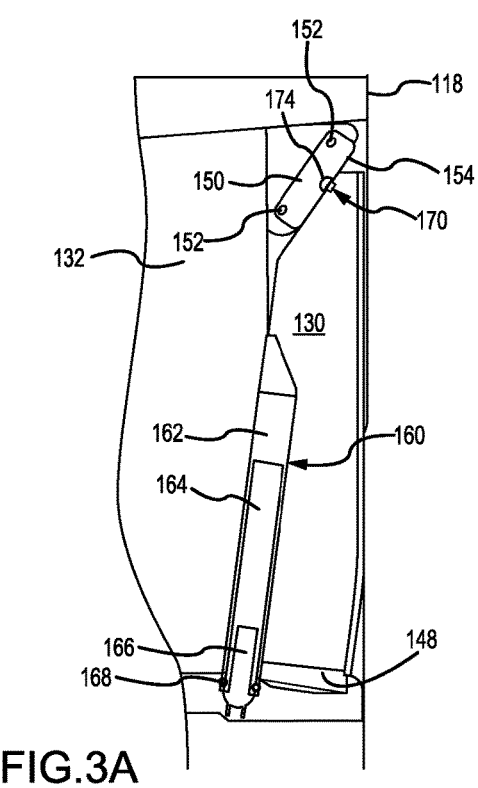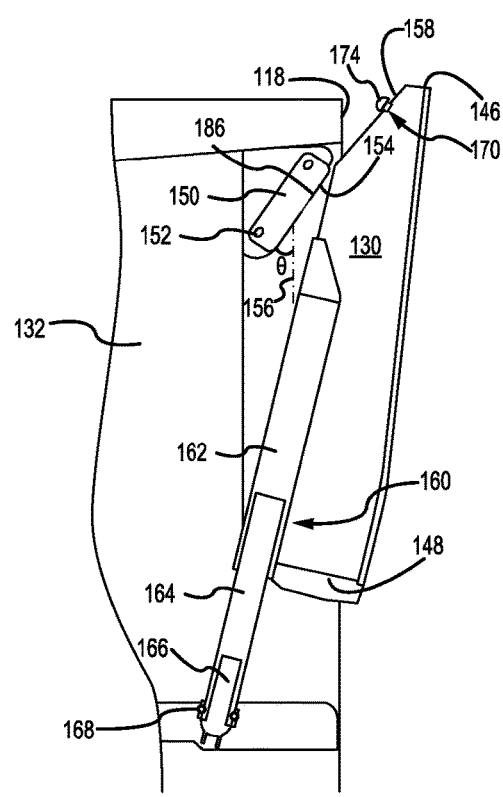
FIG.3A
FIG.3B

INTERIOR DROGUE PARACHUTE ASSEMBLY FOR EJECTION SEATS

This application claims priority to, and the benefit of, U.S. Provisional Application Ser. No. 63/013,220, filed Apr. 21, 2020 and titled "INTERIOR DROGUE PARACHUTE ASSEMBLY FOR EJECTION SEATS," which is incorporated by reference herein in its entirety for all purposes.

FIELD

The present disclosure relates to ejection seats, and more specifically, to drogue parachute assemblies and methods of installing drogue parachute assemblies in ejection seats.

BACKGROUND

During ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

The drogue bridle (also referred to as risers) attaches the drogue parachute to the ejection seat. The drogue bridle is usually routed around the rocket cutout in the seatback such that the seatback can be installed into the cockpit with the rocket already attached to the actuator. The bridle is folded and tacked along the seat back frame to prevent interference with other ejection system structures This routing and tacking tends to be tedious and time consuming for installers.

SUMMARY

A drogue parachute assembly is disclosed herein. In accordance with various embodiments, the drogue parachute assembly may comprise a canopy housing and a mortar including an inner mortar tube and an outer mortar tube configured to telescope relative to the inner mortar tube. The canopy housing may be coupled to the outer mortar tube. The drogue parachute assembly may further comprise a guide plate configured to contact an interface surface of the canopy housing and pivot the mortar about a pivot joint.

In various embodiments, the guide plate may be located proximate a first end of the canopy housing. The inner mortar tube may be rotatably coupled to the pivot joint proximate a second end of the canopy housing, the second end of the canopy housing being opposite the first end of the canopy housing.

In various embodiments, the canopy housing may comprise a cover including a first locking loop and a main body including a second locking loop. In various embodiments, a canopy may be located in the canopy housing and a riser may be coupled to the canopy. A portion of the riser may be located through the first locking loop and the second locking loop.

In various embodiments, a canopy storage bag may be located within the canopy housing. The canopy storage bag may include a fabric portion defining a plurality of channels. In various embodiments, the canopy storage bag may further include a support structure defining a mortar groove configured to receive the outer mortar tube.

In various embodiments, the guide plate may define a slotted opening. The slotted opening may have a first portion including a first diameter and a second portion including a second diameter less than the first diameter. In various embodiments, a pin may be coupled to the interface surface of the canopy housing. A diameter of a head of the pin may be less than the first diameter of the first portion of the slotted opening and greater than the second diameter of the second portion of the slotted opening.

An ejection seat is also disclosed herein. In accordance with various embodiments, the ejection seat comprises a seat back and a drogue parachute assembly located in an interior of the seat back. The drogue parachute assembly may comprise a canopy housing, a mortar including an inner mortar tube and an outer mortar tube configured to telescope relative to the inner mortar tube, and a guide plate coupled to the seat back. The outer mortar tube may be coupled to the canopy housing, and the inner mortar tube may be rotatably coupled to the seat back via a pivot joint. The guide plate may be configured to contact an interface surface of canopy housing and pivot the mortar. about the pivot joint In various embodiments, a face of the guide plate may be oriented at an angle between 15° and 65° relative to a plane parallel to a back side of the seat back. In various embodiments, the guide plate may be located proximate a first end of the canopy housing, and the inner mortar tube may be rotatably coupled to the pivot joint proximate a second end of the canopy housing, the second end of the canopy housing being opposite the first end of the canopy housing.

In various embodiments, the canopy housing may comprise a cover and a main body. In various embodiments, a canopy may be located in the main body of the canopy housing, and a riser may be coupled to the canopy and the seat back.

In various embodiments, the cover may include a first locking loop and the main body may include a second locking loop, and a portion of the riser may be located through the first locking loop and the second locking loop.

In various embodiments, a canopy storage bag may be located within the canopy housing. The canopy storage bag may include a fabric portion defining a plurality of channels. In various embodiments, a canopy may be located in the canopy storage bag, and a plurality of suspension lines may be coupled the canopy and located in the plurality of channels, and a riser may be coupled to the plurality of suspension lines and the seat back. The plurality of suspension lines may be located between the canopy and the fabric portion of the canopy storage bag.

A canopy housing for a drogue parachute assembly is also disclosed herein. In accordance with various embodiments, the canopy housing may comprise a main body, a canopy storage bag located in the main body and including a fabric portion defining a plurality of channels, and a cover coupled to the main body.

In various embodiments, the cover may include a first locking loop and the main body may include a second locking loop. The first locking loop and the second locking loop may be configured to receive a portion of a riser.

In various embodiments, the main body may include an interface surface configured to contact a guide plate. In various embodiments, the canopy storage bag may further include a support structure defines a mortar groove.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIG. 3A illustrates a cross-section view of a drogue parachute assembly stowed in the interior of a seat back of an ejection seat, in accordance with various embodiments;

FIG. 3B illustrates a cross-section view of deployment of a drogue parachute assembly from the interior of a seat back of an ejection seat, in accordance with various embodiments;

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
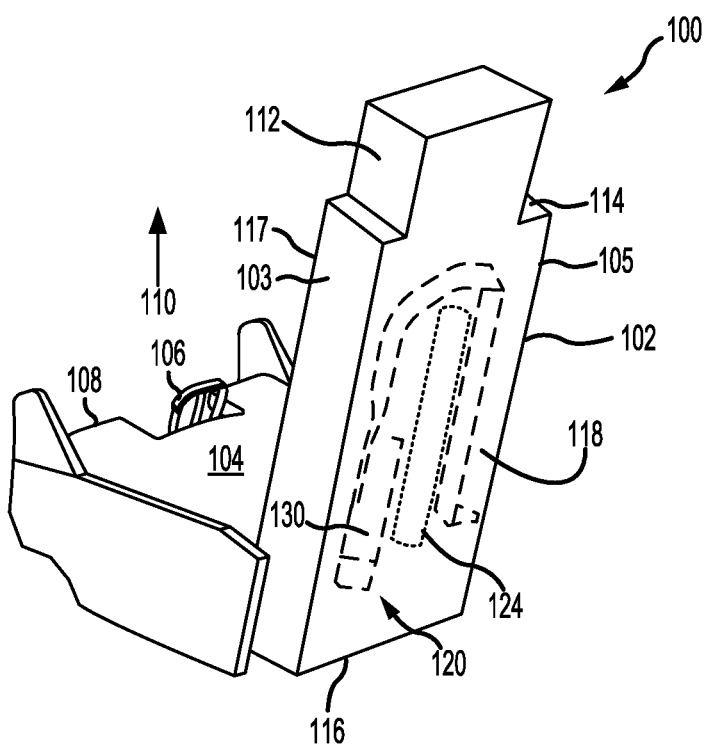
FIG. 1 illustrates an ejection seat, in accordance with various embodiments.

In various embodiments, and with reference to FIG. 1, an ejection seat 100 is illustrated. Ejection seat 100 may be installed in an aircraft cockpit. Ejections seat 100 may be part of an aircraft ejection system configured to safely expel the ejection seat 100 and an occupant of ejection seat 100 from the cockpit of an aircraft.

In accordance with various embodiments, ejection seat 100 includes a seat back 102 and a seat pan 104. A head rest 112 may be located at an upper end 114 of seat back 102. Head rest 112 and upper end 114 are opposite a lower end 116 of seat back 102. In various embodiments, an ejection handle 106 may be located proximate a frontside 108 of seat pan 104. Frontside 108 of seat pan 104 is generally opposite, or distal, seat back 102. While FIG. 1 shows ejection handle 106 located at frontside 108 of seat pan 104, it is further contemplated and understood that ejection handle 106 may be located anywhere that is accessible to an occupant of ejection seat 100. Ejection handle 106 may be configured to initiate an ejection sequence upon actuation. For example, the seat occupant pulling ejection handle 106 in the direction of arrow 110 by may cause ejection seat 100 to be expelled from the aircraft.

Ejection seat 100 includes a drogue parachute assembly 120. Drogue parachute assembly 120 may be located within an interior of seat back 102. Stated differently, drogue parachute assembly 120 may be located in a volume defined by seat back 102. In this regard, drogue parachute assembly 120 may be located between a left side panel 103 and a right side panel 105 of seat back 102, between upper end 114 and lower end 116 of seat back 102, and between a front side 117 and a back side 118 of seat back 102. Upon initiation of the ejection sequence, drogue parachute assembly 120 may deploy a drogue parachute. As described in further detail below, drogue parachute assembly 120 may be configured to direct a canopy housing 130 of drogue parachute assembly 120 away from the ejection seat 100 upon deployment, thereby allowing the drogue parachute assembly 120 to be stowed within the seat back 102. In various embodiments, the canopy housing 130 may be stowed adjacent a rocket catapult 124 of ejection seat 100. Rocket catapult 124 may be configured to expel ejection seat 100 from the aircraft.

Figure 2:
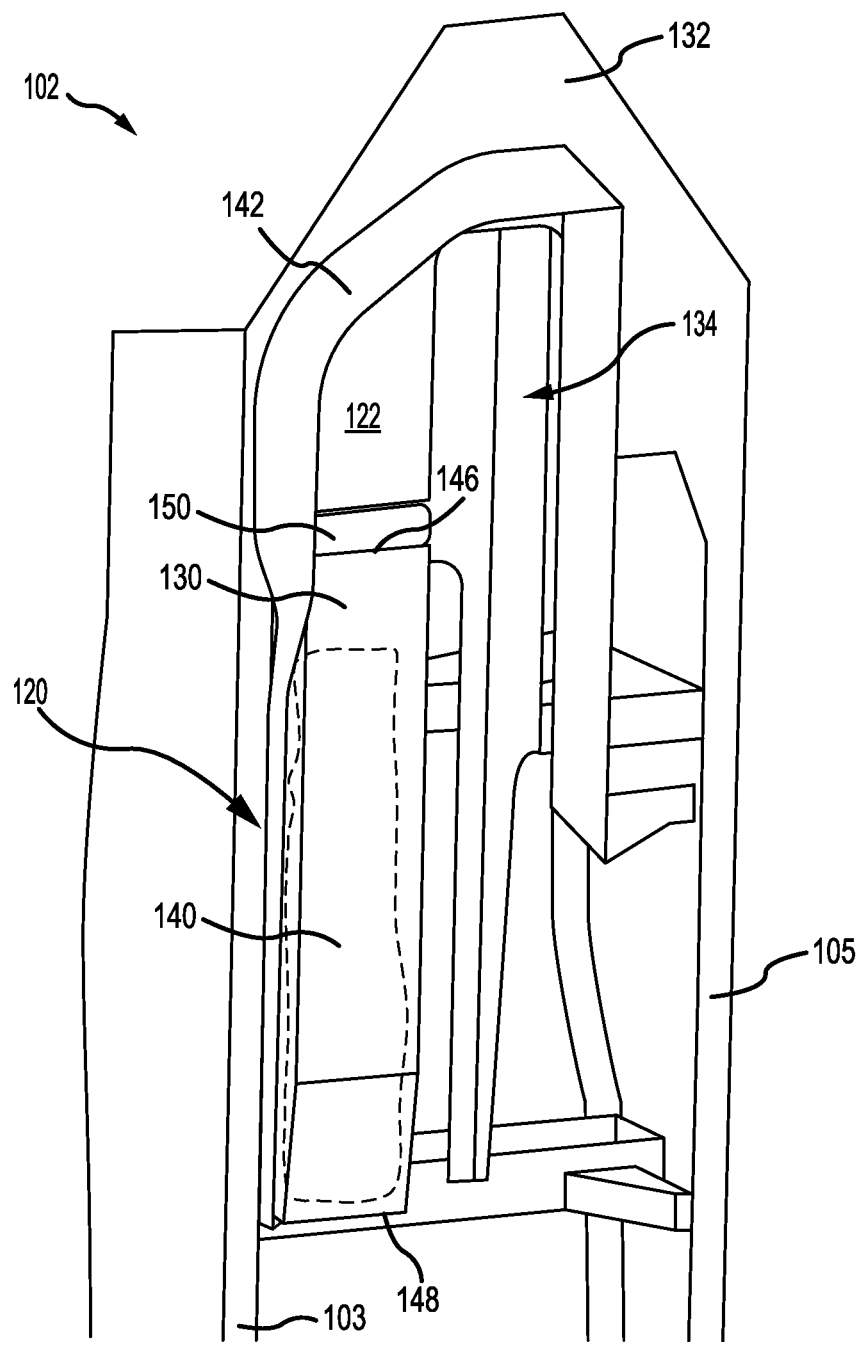
FIG. 2 illustrates perspective view of a drogue parachute assembly stowed in the interior of a seat back of an ejection seat, in accordance with various embodiments.

With reference to FIG. 2, drogue parachute assembly 120 is illustrated in the non-deployed, or "stowed", position, in accordance with various embodiments. Drogue parachute assembly 120 includes a canopy housing 130. A canopy 140 may be located within the canopy housing 130. Canopy housing 130 may be located in an interior volume 122 of seat back 102. Interior volume 122 may be defined by a frame 132 of seat back 102. In various embodiments, canopy housing 130 may be located adjacent to a rocket catapult channel 134 define by frame 132. For example, canopy housing 130 may be located between rocket catapult channel 134 and left side panel 103 of frame 132. Drogue parachute assembly 120 includes risers 142. Risers 142 are attached to seat back 102 and canopy 140. In various embodiments, risers 142 may be attached to frame 132 and to suspension lines 144, with momentary reference to FIG. 5, connected canopy 140.

Drogue parachute assembly 120 includes a guide plate 150. Guide plate 150 may be located at an upper (or first) end 146 of canopy housing 130. Upper end 146 is opposite a lower (or second) end 148 of canopy housing 130. Risers 142 may be coupled to second end 148 of canopy housing 130. As discussed in further detail below, canopy 140 may exit canopy housing 130 through second end 148 of canopy housing 130.

With reference to FIGS. 3A and 3B, a cross-section view of drogue parachute assembly 120 in the non-deployed position and a cross-section view of drogue parachute assembly 120 during deployment are illustrated, respectively. In accordance with various embodiments, drogue parachute assembly 120 includes a mortar 160. Mortar 160 is configured to propel canopy housing 130 toward guide plate 150 and out seat back 102. Mortar 160 includes an outer mortar tube 162 and an inner mortar tube 164. Outer mortar tube 162 is attached to canopy housing 130. Inner mortar tube 164 is attached to seat back 102 via a pivot joint 168. Outer mortar tube 162 may be configured to receive inner mortar tube 164 in a manner that allows the two components to telescope with respect to one another. A gas generator 166 may be attached mortar 160. Gas generator 166 is configured to, upon initiation of the ejection sequence, generate a burst of gas that pushes, or otherwise translates, outer mortar tube 162 toward guide plate 150 and out seat back 102. In various embodiments, gas generator 166 may comprise an electrically activated pyrotechnic device configured to generate the burst of gas in response to receiving an electric signal.

Guide plate 150 may be mounted to seat back 102, for example, to frame 132, via fasteners 152. Fasteners 152 may comprise screws, nuts, bolts, rivets, clips, or any other suitable securement device. A face 154 of guide plate 150 is angled to direct canopy housing 130 and outer mortar tube 162 away from upper end 114 of seat back 102. For example, and as shown in FIG. 3B, face 154 may be oriented at an angle theta (θ) of between 5° and 85°, between 15° and 65°, between 35° and 55°, and/or about 45°, relative to a plane 156 parallel to back side 118 of seat back 102. In various embodiments, during expulsion of the ejection seat 100 from the cockpit, ejection seat 100 may travel along a rail mounted to the aircraft. In various embodiments, plane 156 is parallel to the rail along which ejection seat 100 translates during expulsion of ejection seat 100 from the aircraft cockpit.

In various embodiments, an interface surface 158 of canopy housing 130 is oriented at an angle similar to face 154. The angle of interface surface 158 may facilitate translation of canopy housing 130 along face 154 of guide plate 150 and/or may help direct canopy housing 130 out and away from back side 118 of seat back 102. In accordance with various embodiments, inner mortar tube 164 is mounted to frame 132 via pivot joint 168. Pivot joint 168 may be located proximate second end 148 of canopy housing 130. Pivot joint 168 is configured to allow inner mortar tube 164 to pivot relative to frame 132. As canopy housing 130 translates along face 154, inner mortar tube 164 may pivot about pivot joint 168, thereby changing the direction or trajectory of outer mortar tube 162. In this regard, guide plate 150 is configured to pivot mortar 160 about pivot joint 168. The angle of interface surface 158 of canopy housing 130 and face 154 of guide plate 150 are selected such that as interface surface 158 translates along face 154, mortar 160 pivots to an orientation that avoids outer mortar tube 162 contacting seat back 102.

Figure 4:
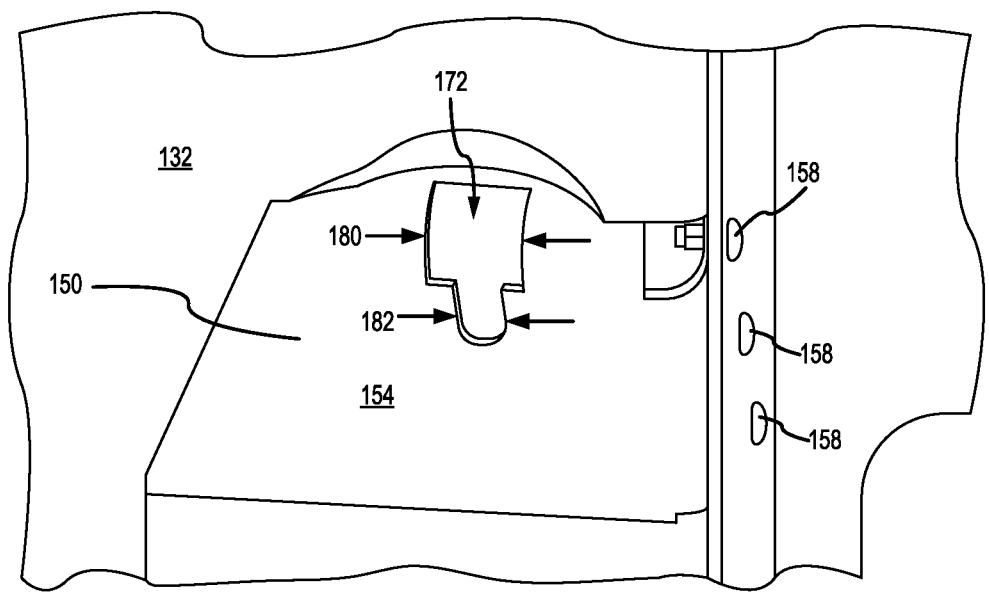
FIG. 4 illustrates a perspective view of a guidance bracket of a drogue parachute assembly, in accordance with various embodiments.

In various embodiments, canopy housing 130 may include a pin 170. Pin 170 may be attached to and may extend from interface surface 158 of canopy housing 130. In the stowed position, pin 170 may be located through a slotted opening 172 defined by guide plate 150. With combined reference to FIG. 3B and FIG. 4, slotted opening 172 may include a first diameter (or width) 180 and a second diameter (or width) 182. Diameter 180 is greater than the diameter of a head 174 of pin 170. Diameter 182 is less than the diameter of head 174. In this regard, during installation of canopy housing 130, head 174 of pin 170 may be inserted through the portion of slotted opening 172 having diameter 180. Pin 170 is then translated into the portion of slotted opening 172 having diameter 182. When pin 170 is located through the portion having diameter 182, head 174 generates an inference with a back surface 186 of guide plate 150, thereby blocking or preventing translation of canopy housing 130 in a direction normal to face 154 of guide plate 150. Back surface 186 of guide plate 150 is opposite face 154 of guide plate 150. The inference between head 174 and guide plate 150 may reduce rattling of canopy housing 130.

Figure 5:
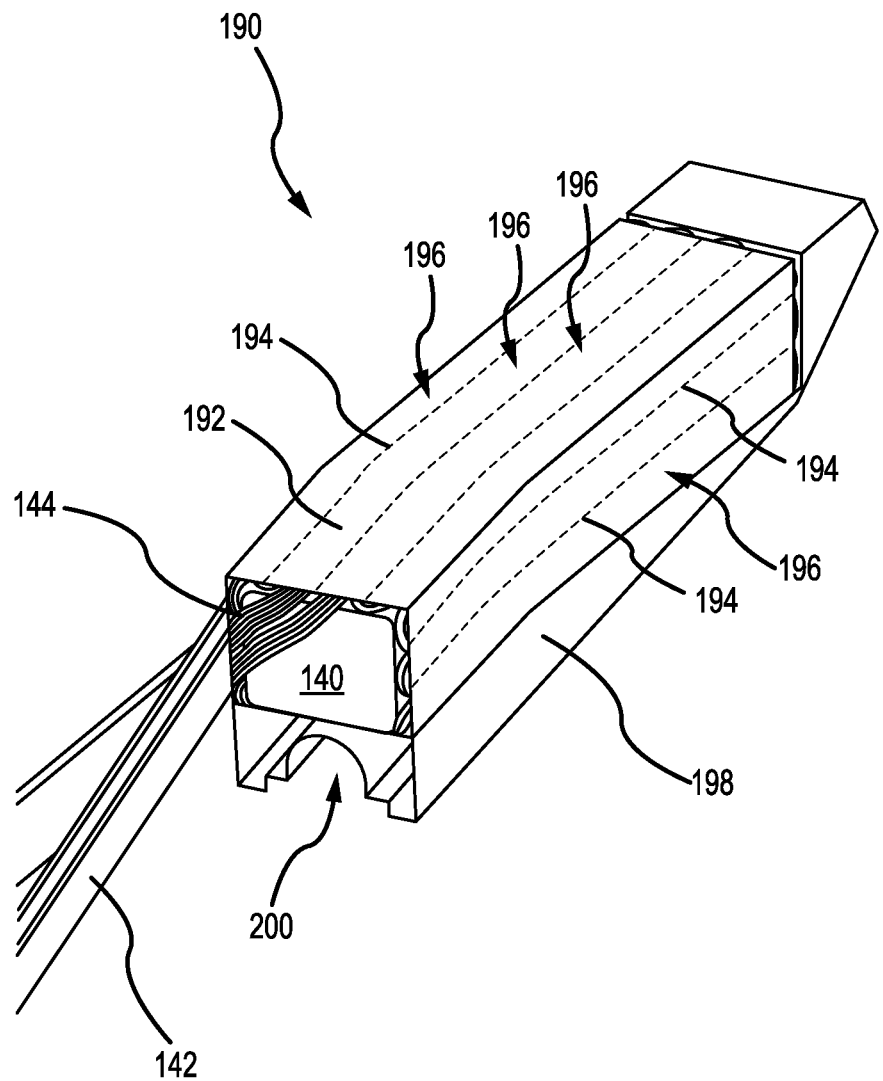
FIG. 5 illustrates a perspective view a drogue canopy stowed in a canopy storage bag, in accordance with various embodiments.

With reference to FIG. 5, a canopy storage bag 190 of drogue parachute assembly 120 is illustrated. In accordance with various embodiments, canopy 140 and suspension lines 144 may be stowed, packed, or otherwise housed within canopy storage bag 190. Suspension lines 144 may be coupled to canopy 140 using any suitable attachment technique, such as, for example, through stitching. In various embodiments, suspension lines 144 may connect canopy 140 to risers 142. Suspension lines 144 and risers 142 may comprise any suitable material. For example, suspension lines 144 may comprise a tubular braided material that constricts in diameter under tension, such as, for example, nylon, aramid fiber (e.g., KEVLAR®), and/or the like. Risers 142 may comprise a webbing formed from nylon, aramid fiber (e.g., KEVLAR®), and/or the like.

In various embodiments, canopy storage bag 190 includes a fabric portion 192.

Fabric portion 192 may comprise any suitable type of material, such as, for example, canvas, silk, nylon, aramid fiber (e.g., KEVLAR®), polyethylene terephthalate, and/or the like. Fabric portion 192 may include stitching 194. Stitching 194 may form a plurality of channels (or "flutes") 196 along the inner perimeter of fabric portion 192. Suspension lines 144 may be serpentined through the channels 196. In this regard, suspension lines 144 may be stowed within channels 196 defined by fabric portion 192. Canopy 140 may be inserted into interior canopy storage bag 190 such that suspension lines 144 are located between canopy 140 and fabric portion 192. In various embodiments, fabric portion 192 may be coupled to a support structure 198 of canopy storage bag 190. Support structure 198 may comprise a more rigid material, as compared to fabric portion 192. For example, support structure 198 may comprise metal, plastic, ceramic, a composite material, wood, or any other suitably rigid material. Support structure 198 may define a mortar groove 200 configured to receive or be located around outer mortar tube 162, with momentary reference to FIG. 3B.

Figure 6A:
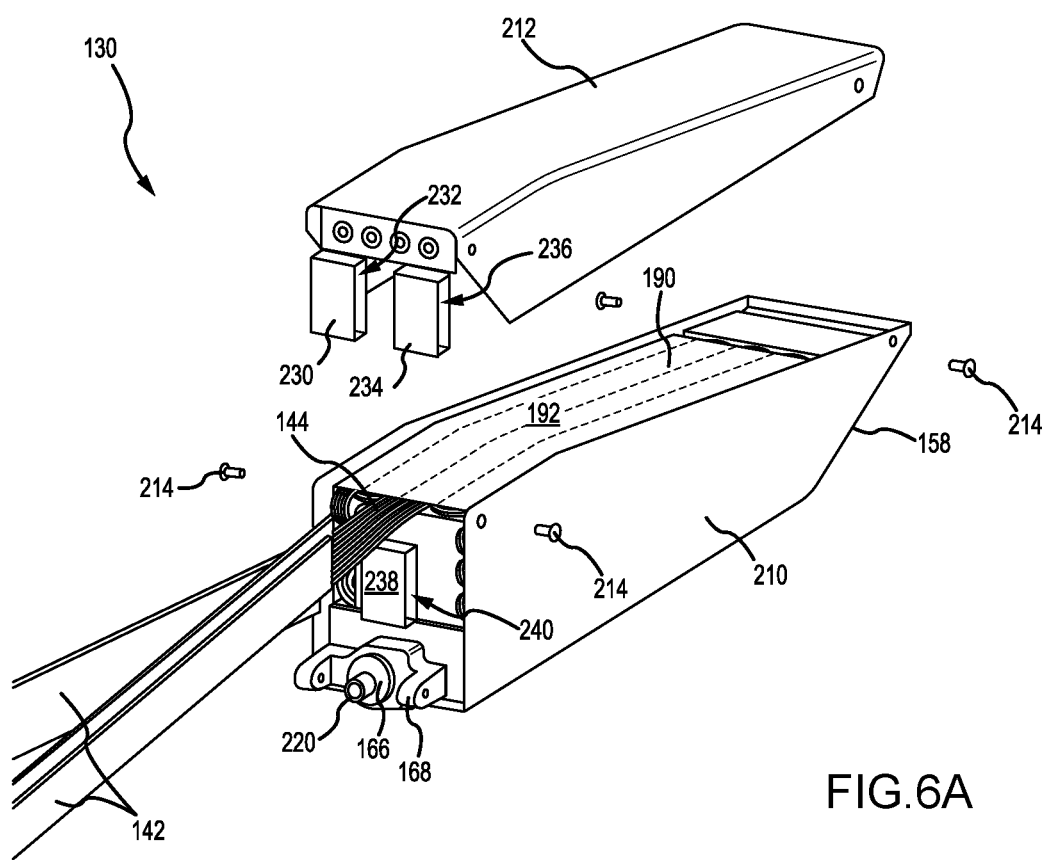
FIGS. 6A and 6B illustrate a drogue parachute assembly in a canopy housing, in accordance with various embodiments.
Figure 6B:
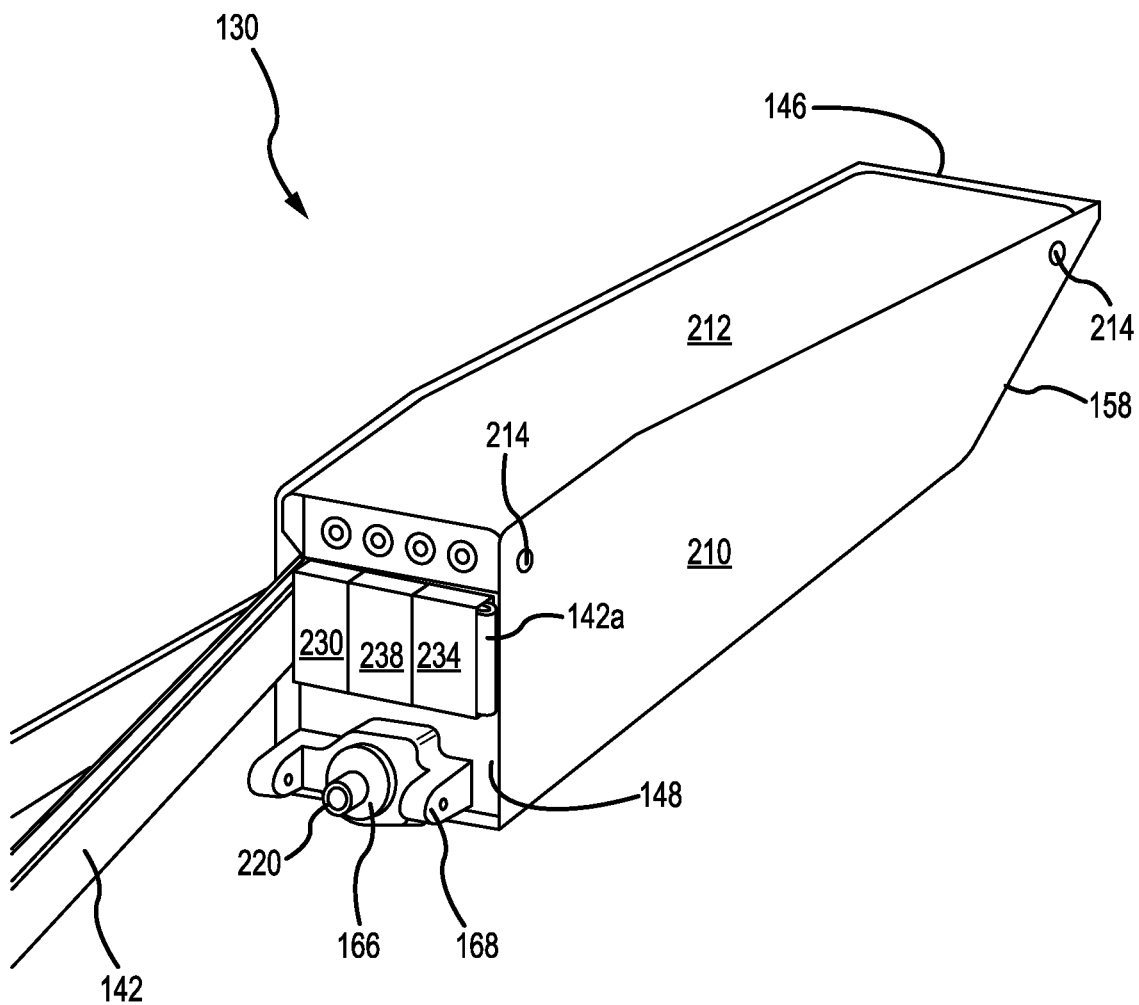

With reference to FIGS. 6A and 6B, additional details of canopy housing 130 are illustrated. In accordance with various embodiments, canopy housing 130 includes a main body 210 and a cover 212. Cover 212 may be attached to main body 210 via fasteners 214. Canopy storage bag 190, with canopy 140 and suspension lines 144 located therein, may be located within main body 210. When securing cover 212 to main body 210, cover 212 may force fabric portion 192 toward support structure 198. In this regard, prior to attaching cover 212, fabric portion 192 may extend outside of main body 210. Attaching cover 212 may compress fabric portion 192 between cover 212 and main body 210, thereby reducing the envelope of canopy storage bag 190.

Main body 210 may also house mortar 160. Outer mortar tube 162, with momentary reference to FIG. 3B, may be coupled to main body 210, such that main body 210 translates with outer mortar tube 162. Pivot joint 168 and an input 220 of gas generator 166 may be located at second end 148 of canopy housing 130. Main body 210 may define interface surface 158.

In various embodiments, cover 212 may include one or more locking loops, such as locking loop 230 and locking loop 234. Locking loop 230 defines a loop, or opening, 232. Locking loop 234 defines a loop, or opening, 236. Main body 210 also includes one or more locking loops, such as locking loop 238 Locking loop 238 defines a loop, or opening, 240. During installation, a portion 142a (FIG. 6B) of risers 142 may be located through locking loops 230, 238, 234. Locating portion 142a of risers 142 in locking loops 230, 238, 234 may prevent or block locking loops 230, 238, 234 from rotating away from second end 148 of canopy housing 130. Stated differently, in response to removal of portion 142a of risers 142 from locking loops 230, 238, 234, locking loops 230, 234 may pivot in an upward (or first) direction away from pivot joint 168, and locking loop 238 may pivot in an opposite, downward (or second) direction toward pivot joint 168. Securing locking loops 230, 238, 234 to one another creates an interference that blocks canopy 140 from exiting canopy storage bag 190. Stated differently, locating portion 142a of risers 142 in locking loops 230, 238, 234 may secure (i.e., close) second end 148 of canopy housing 130 to prevent deployment of canopy 140.

Figure 7A:
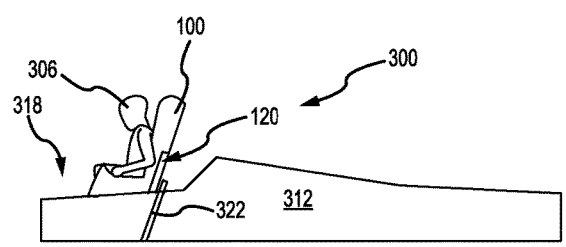
FIGS. 7A, 7B, and 7C illustrate deployment of a drogue parachute in response to the expulsion of an ejection seat from an aircraft, in accordance with various embodiments.
Figure 7B:
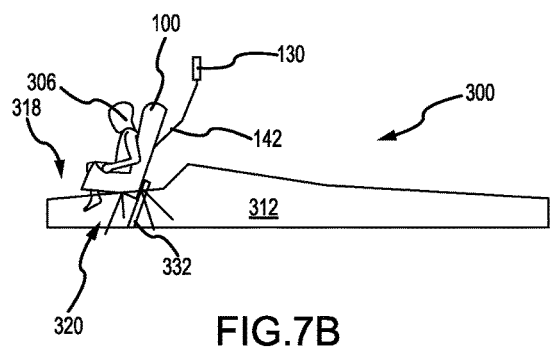
Figure 7C:
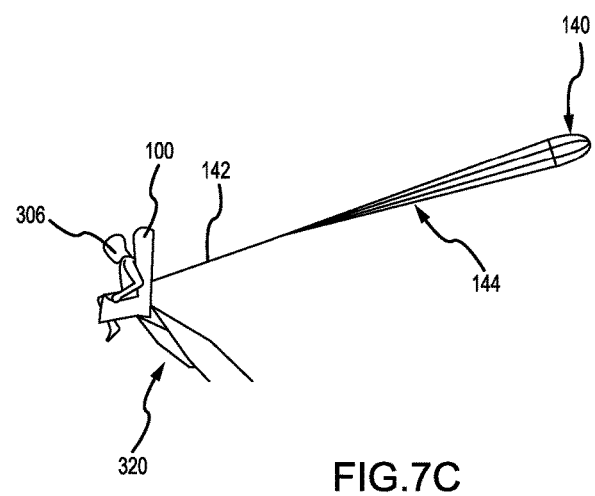

With reference to FIGS. 7A, 7B, and 7C, an aircraft ejection system 300 is shown, in accordance with various embodiments. Aircraft ejection system 300 may be installed in an aircraft 312 to expel ejection seat 100 and an occupant 306 of ejection seat 100 from a cockpit 318 of aircraft 312. Ejection seat 100 may be urged from cockpit 318 by a propulsion system 320.

In accordance with various embodiments, ejection seat 100 includes drogue parachute assembly 120 as described above in accordance with various embodiments. Drogue parachute assembly 120 may be configured to deploy and/or gas generator 166 (FIG. 3A) may fire a predetermined time after initiation of the ejection sequence and/or in response to another ejection event (e.g., in response to ejection seat 100 traveling over a switch located on rail 322). In accordance with various embodiments, and with additional reference to FIG. 3B, the force generated by gas generator 166 launches outer mortar tube 162 and canopy housing 130 from ejection seat 100. As canopy housing 130 and outer mortar tube 162 travel upward (i.e., toward the seat headrest), the contact between guide plate 150 and interface surface 158 of canopy housing 130 pivots mortar 160 (e.g., inner mortar tube 164) about pivot joint 168, thereby directing the trajectory of outer mortar tube 162 and canopy housing 130 away from the interior of the seat back. As a distance between canopy housing 130 and ejection seat 100 increases, the tension in risers 142 begins to increase. The increase in the tension in risers 142 eventually pulls portion 142a of risers 142, with momentary reference to FIG. 6B, from locking loops 230, 238, 234, thereby allowing canopy 140 to deploy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drogue parachute assembly, comprising:
    a canopy housing;
    a mortar including an inner mortar tube and an outer mortar tube configured to telescope relative to the inner mortar tube, wherein the canopy housing is coupled to the outer mortar tube; and
    a guide plate configured to contact an interface surface of the canopy housing and pivot the mortar about a pivot joint, wherein the guide plate defines a slotted opening, the slotted opening having a first portion including a first diameter and a second portion including a second diameter less than the first diameter.

2. The drogue parachute assembly of claim 1, wherein the guide plate is located proximate a first end of the canopy housing, and wherein the inner mortar tube is rotatably coupled to the pivot joint proximate a second end of the canopy housing, the second end of the canopy housing opposite the first end of the canopy housing.

3. The drogue parachute assembly of claim 2, wherein the canopy housing comprises a cover including a first locking loop and a main body including a second locking loop.

4. The drogue parachute assembly of claim 3, further comprising:
a canopy located in the canopy housing; and
a riser coupled to the canopy, wherein a portion of the riser is located through the first locking loop and the second locking loop.

5. The drogue parachute assembly of claim 1, further comprising a canopy storage bag located within the canopy housing, the canopy storage bag including a fabric portion defining a plurality of channels.

6. The drogue parachute assembly of claim 5, wherein the canopy storage bag further includes a support structure defining a mortar groove configured to receive the outer mortar tube.

7. The drogue parachute assembly of claim 1, further comprising a pin coupled to the interface surface of the canopy housing, wherein a diameter of a head of the pin is less than the first diameter of the first portion of the slotted opening and greater than the second diameter of the second portion of the slotted opening.

8. An ejection seat, comprising:
a seat back; and
a drogue parachute assembly located in an interior of the seat back, the drogue parachute assembly comprising:
a canopy housing;
a mortar including an inner mortar tube and an outer mortar tube configured to telescope relative to the inner mortar tube, wherein the outer mortar tube is coupled to the canopy housing, and wherein the inner mortar tube is rotatably coupled to the seat back via a pivot joint; and
a guide plate coupled to the seat back, wherein the guide plate is configured to contact an interface surface of canopy housing and pivot the mortar about the pivot joint, wherein the guide plate defines a slotted opening, the slotted opening having a first portion including a first diameter and a second portion including a second diameter less than the first diameter.

9. The ejection seat of claim 8, wherein a face of the guide plate is oriented at an angle between 15° and 65° relative to a plane parallel to a back side of the seat back.

10. The ejection seat of claim 8, wherein the guide plate is located proximate a first end of the canopy housing, and wherein the inner mortar tube is rotatably coupled to the pivot joint proximate a second end of the canopy housing, the second end of the canopy housing opposite the first end of the canopy housing.

11. The ejection seat of claim 9, wherein the canopy housing comprises a cover and a main body.

12. The ejection seat of claim 11, further comprising:
a canopy located in the main body of the canopy housing; and
a riser coupled to the canopy and the seat back.

13. The ejection seat of claim 12, wherein the cover includes a first locking loop and the main body includes a second locking loop, and wherein a portion of the riser is located through the first locking loop and the second locking loop.

14. The ejection seat of claim 8, further comprising a canopy storage bag located within the canopy housing, the canopy storage bag including a fabric portion defining a plurality of channels.

15. The ejection seat of claim 14, further comprising:
a canopy located in the canopy storage bag;
a plurality of suspension lines coupled the canopy and located in the plurality of channels, wherein the plurality of suspension lines are located between the canopy and the fabric portion of the canopy storage bag; and
a riser coupled to the plurality of suspension lines and the seat back.

16. A canopy housing for a drogue parachute assembly, comprising:
a main body, wherein the main body includes an interface surface configured to contact a guide plate, wherein the guide plate defines a slotted opening, the slotted opening having a first portion including a first diameter and a second portion including a second diameter less than the first diameter;
a pin attached to and extending from the interface surface, the pin configured to locate through the slotted opening;
a canopy storage bag located in the main body and including a fabric portion defining a plurality of channels; and
a cover coupled to the main body.

17. The canopy housing of claim 16, wherein the cover includes a first locking loop and the main body includes a second locking loop, and wherein the first locking loop and the second locking loop are configured to receive a portion of a riser.

18. The canopy housing of claim 17, wherein the canopy storage bag further includes a support structure defines a mortar groove.

* * * * *